United States Patent
Sun et al.

(10) Patent No.: US 10,271,287 B2
(45) Date of Patent: Apr. 23, 2019

(54) POWER CONTROL IN A WIRELESS NETWORK

(71) Applicant: Telefonaktiebolaget LM Ericsson (publ), Stockholm (SE)

(72) Inventors: Ying Sun, Sundbyberg (SE); Wei Zhao, Solna (SE); Yufeng Zhao, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/559,988

(22) PCT Filed: Apr. 13, 2015

(86) PCT No.: PCT/SE2015/050434
§ 371 (c)(1),
(2) Date: Sep. 20, 2017

(87) PCT Pub. No.: WO2016/167692
PCT Pub. Date: Oct. 20, 2016

(65) Prior Publication Data
US 2018/0070316 A1    Mar. 8, 2018

(51) Int. Cl.
*H04W 52/14* (2009.01)
*H04W 52/10* (2009.01)
(Continued)

(52) U.S. Cl.
CPC ......... *H04W 52/146* (2013.01); *H04W 52/10* (2013.01); *H04W 52/245* (2013.01);
(Continued)

(58) Field of Classification Search
CPC . H04W 52/10; H04W 52/146; H04W 52/244; H04W 52/245; H04W 52/246; H04W 76/27
(Continued)

(56) References Cited

U.S. PATENT DOCUMENTS 9,538,410 B2 * 1/2017 Park ..................... H04B 7/2643
2004/0176033 A1 * 9/2004 Tamaki ................. H04W 52/24
455/59
(Continued)

FOREIGN PATENT DOCUMENTS

CN    102244923 A    11/2011
EP    2709408 A1    3/2014

OTHER PUBLICATIONS

Anritsu, "UL power requirements for RLM tests 7.3.x in TS 36.521-3", 3GPP TSG-RAN5 Meeting #52, Aug. 22-26, 2011, pp. 1-8, Athens, Greece, doc R5-113229.
(Continued)

*Primary Examiner* — Tan H Trinh
(74) *Attorney, Agent, or Firm* — Sage Patent Group

(57) ABSTRACT

There is provided a method, performed by a network node, for enabling uplink power control in a wireless network. The method comprises assigning (S1) a transmit power for downlink transmission of a reference signal, wherein the reference signal is to be used for power control of at least one uplink transmission. The method further comprises determining (S2) a reference signal transmit power parameter providing a fictitious value for the transmit power of the reference signal that is different from the assigned transmit power. The method also comprises transmitting (S3) the reference signal transmit power parameter to at least one wireless device to enable the wireless device(s) to perform transmit power determination for the uplink transmission(s) at least partly based on the fictitious value for the transmit power of the reference signal.

11 Claims, 13 Drawing Sheets

(51) Int. Cl.
*H04W 52/24* (2009.01)
*H04W 76/27* (2018.01)

(52) U.S. Cl.
CPC ........ *H04W 52/246* (2013.01); *H04W 52/244* (2013.01); *H04W 76/27* (2018.02)

(58) Field of Classification Search
USPC ............. 455/69, 522, 59, 452.1, 436, 226.1; 370/311, 315, 328, 329, 330, 336
See application file for complete search history.

(56) References Cited

U.S. PATENT DOCUMENTS

| | | | | |
|---|---|---|---|---|
| 2007/0133427 A1* | 6/2007 | Taylor | ................... | H04L 45/308 370/252 |
| 2008/0069062 A1* | 3/2008 | Li | ...................... | H04W 52/265 370/338 |
| 2008/0316950 A1* | 12/2008 | Damnjanovic | ..... | H04W 52/146 370/311 |
| 2010/0110983 A1* | 5/2010 | Fu | ........................ | H04J 11/0056 370/328 |
| 2011/0085483 A1* | 4/2011 | Yeon | ................... | H04W 52/365 370/311 |
| 2011/0205954 A1* | 8/2011 | Gorokhov | ............. | H04L 5/0007 370/315 |
| 2012/0213092 A1* | 8/2012 | Sun | ..................... | H04W 52/244 370/248 |
| 2013/0058315 A1* | 3/2013 | Feuersanger | ....... | H04W 52/281 370/336 |
| 2013/0077571 A1* | 3/2013 | Papasakellariou | .. | H04W 52/325 370/328 |
| 2013/0084818 A1* | 4/2013 | Croman | ............ | H04W 52/0245 455/226.1 |
| 2013/0217404 A1* | 8/2013 | Jung | ..................... | H04W 72/08 455/452.1 |
| 2014/0016576 A1* | 1/2014 | Noh | ................... | H04W 52/362 370/329 |
| 2014/0112260 A1* | 4/2014 | Sorrentino | .......... | H04W 52/325 370/329 |
| 2014/0307680 A1* | 10/2014 | Zhang | .................. | H04L 1/1861 370/329 |
| 2014/0342738 A1* | 11/2014 | Ishii | ...................... | H04W 28/08 455/436 |
| 2015/0003359 A1* | 1/2015 | Hoshino | ............... | H04W 24/08 370/329 |
| 2015/0201386 A1* | 7/2015 | Kimura | ............... | H04W 52/245 455/522 |
| 2015/0341921 A1* | 11/2015 | Chen | ................. | H04W 72/0413 370/330 |
| 2015/0350955 A1* | 12/2015 | Somasundaram | .... | H04W 28/20 370/329 |
| 2015/0358124 A1* | 12/2015 | Suzuki | ................. | H04L 1/1861 370/329 |
| 2016/0183199 A1* | 6/2016 | Takeda | ................. | H04W 52/28 370/329 |
| 2016/0183203 A1* | 6/2016 | Larsson | .............. | H04W 52/241 370/329 |
| 2017/0126439 A1* | 5/2017 | Yoshimoto | .......... | H04L 25/0226 |
| 2017/0202025 A1* | 7/2017 | Ouchi | .............. | H04W 74/0833 |
| 2018/0014257 A1* | 1/2018 | Ouchi | .................. | H04W 52/40 |

OTHER PUBLICATIONS

ZTE, "Consideration for uplink power control in UL CoMP", 3GPP TSG RAN WG1 Meeting #67, Nov. 14-18, 2011, pp. 1-4, San Francisco, US, R1-113759.

Catt, "Uplink power control discussions for CoMP", 3GPP TSG RAN WG1 Meeting #67, Nov. 14-18, 2011, pp. 1-5, San Francisco, US, R1-113736.

3rd Generation Partnership Project, "Technical Specification Group Radio Access Network; Evolved Universal Terrestrial Radio Access (E-UTRA); Physical layer procedures (Release 10)", 3GPP TS 36.213 V10.12.0, Mar. 2014, pp. 1-18.

3rd Generation Partnership Project, "Technical Specification Group Radio Access Network; Evolved Universal Terrestrial Radio Access (E-UTRA); Physical Channels and Modulation (Release 10)", 3GPP TS 36.211 V10.7.0, Feb. 2013, pp. 1-13.

Catt, "Uplink power control discussions for CoMP", 3GPP TSG RAN WG1 Meeting #66bis, Oct. 10-14, 2011, pp. 1-5, R1-112964.

* cited by examiner

POWER CONTROL IN A WIRELESS NETWORK

TECHNICAL FIELD

The proposed technology generally relates to power control in wireless networks, and specifically to a method and network node for enabling uplink power control, and a method and wireless device for uplink power control, and corresponding computer programs and computer program products, as well as an apparatus for enabling uplink power control and an apparatus for uplink power control in a wireless network.

BACKGROUND

Power control generally relates to the issue of determining and assigning transmit power for radio transmissions in a wireless network. By way of example, power control is used for dynamically adjusting the transmit power of base stations such as eNBs and wireless devices such as UEs based on variations of the channel quality and so forth to achieve and maintain a desired Quality of Service, QoS, reduce interference to enhance network capacity and/or keep the power consumption at a sustainable level while maintaining acceptable performance.

Power control may also be categorized into downlink power control and uplink power control. Also, there are generally two types of power control, closed loop power control and open loop power control. In closed loop power control, the transmitter sends with a certain power setting and the receiver can send feedback to the transmitter requesting the transmitter to increase or decrease the power. The loop is running in a cyclic matter and several loops may be needed before an optimal power setting is achieved. Open loop power control is used in cases where receiver feedback is considered unfeasible such as during UE initial set up phase. With open loop power control, the transmitter will measure certain signals with known characteristics and choose a power setting it believes has the optimal level.

For example, in Long Term Evolution, LTE, the Physical Uplink Shared Channel, PUSCH, and the Physical Uplink Control Channel, PUCCH, are subject to a combined open and closed loop power control algorithm, i.e. to control the transmission power for uplink physical channels a combination of an open and a closed loop power control procedure is used. The Physical Random Access Channel, PRACH, is subject only to open loop power control.

With the increased complexity of modern network deployment scenarios, power control, like many other network functions, is facing new requirements and challenges. For example, there may be scenarios where the UE may need to increase the uplink power to a level higher that a maximum defined target power, or the UE may need to increase the uplink power further due to interference by another nearby UE.

However, the closed loop power control procedure has some limitations, making it challenging to effectively handle such scenarios. For example, the closed loop procedure introduces extra loops of adjustment of the power, thus increasing the delay to reach proper power settings. It generally needs to apply the change in power settings separately to different physical uplink channels, which introduces considerable complexity. Also, it cannot impact physical channels such as the PRACH, where only open loop power control can be applied.

SUMMARY

It is therefore desirable to provide improved mechanisms for uplink power control.

It is an object to provide a method, performed by a network node, for enabling uplink power control in a wireless network.

It is also an object to provide a method, performed by a wireless device, for uplink power control in a wireless network.

Another object is to provide a network node configured to enable uplink power control in a wireless network.

Yet another object is to provide a wireless device configured for uplink power control in a wireless network.

Still another object is to provide corresponding computer programs and computer program products.

It is also an object to provide an apparatus for enabling uplink power control in a wireless network.

A further object is to provide an apparatus for uplink power control in a wireless network.

These and other objects are met by embodiments of the proposed technology.

According to a first aspect, there is provided a method, performed by a network node, for enabling uplink power control in a wireless network. The method comprises assigning a transmit power for downlink transmission of a reference signal, wherein the reference signal is to be used for power control of at least one uplink transmission. The method further comprises determining a reference signal transmit power parameter providing a fictitious value for the transmit power of the reference signal that is different from the assigned transmit power. The method also comprises transmitting the reference signal transmit power parameter to at least one wireless device to enable the wireless device(s) to perform transmit power determination for the uplink transmission(s) at least partly based on the fictitious value for the transmit power of the reference signal.

In this way, by introducing a controlled discrepancy between the information that the network node sends to the wireless device(s) regarding the transmit power of the reference signal and the actual transmit power that the network node uses for the reference signal transmission, it is possible to provide efficient uplink power control. In particular, the uplink power can be controlled to reach a desired power level with lower delay and/or with improved granularity. The wireless device is also allowed to converge to a desired power level on all relevant uplink physical channels at the same time.

According to a second aspect, there is provided a method, performed by a wireless device, for uplink power control in a wireless network. The method comprises estimating a received power of a received reference signal, the reference signal being transmitted from a network node with a transmit power. The method further comprises receiving a reference signal transmit power parameter providing a fictitious value for the transmit power of the reference signal that is different from the actual transmit power of the reference signal. The method also comprises determining a transmit power for uplink transmission at least partly based on the estimated received power and the fictitious value for the transmit power of the reference signal.

According to a third aspect, there is provided a network node configured to enable uplink power control in a wireless network. The network node is configured to assign a transmit power for downlink transmission of a reference signal, wherein the reference signal is to be used for power control of at least one uplink transmission. The network node is configured to determine a reference signal transmit power parameter providing a fictitious value for the transmit power of the reference signal that is different from the assigned transmit power. The network node is also configured to transmit the reference signal transmit power parameter to at least one wireless device to enable the wireless device(s) to perform transmit power determination for the uplink transmission(s) at least partly based on the fictitious value for the transmit power of the reference signal.

According to a fourth aspect, there is provided a wireless device configured for uplink power control in a wireless network. The wireless device is configured to estimate a received power of a received reference signal, the reference signal being transmitted from a network node with a transmit power. The wireless device is configured to receive a reference signal transmit power parameter providing a fictitious value for the transmit power of the reference signal that is different from the actual transmit power of the reference signal. The wireless device is also configured to determine a transmit power for uplink transmission at least partly based on the estimated received power and the fictitious value for the transmit power of the reference signal.

According to a fifth aspect, there is provided a computer program comprising instructions, which when executed by at least one processor, cause the at least one processor to:
  assign a transmit power for downlink transmission of a reference signal, wherein the reference signal is to be used for power control of at least one uplink transmission;
  determine a reference signal transmit power parameter providing a fictitious value for the transmit power of the reference signal that is different from the assigned transmit power; and
  prepare the reference signal transmit power parameter for transmission to at least one wireless device to enable the wireless device(s) to perform transmit power determination for the uplink transmission(s) at least partly based on the fictitious value for the transmit power of the reference signal.

According to a sixth aspect, there is provided a computer program comprising instructions, which when executed by at least one processor, cause the at least one processor to:
  estimate a received power of a received reference signal, the reference signal being transmitted from a network node with a transmit power;
  receive a reference signal transmit power parameter providing a fictitious value for the transmit power of the reference signal that is different from the actual transmit power of the reference signal;
  determine a transmit power for uplink transmission at least partly based on the estimated received power and the fictitious value for the transmit power of the reference signal.

According to a seventh aspect, there is provided a computer program product comprising a computer-readable medium having stored thereon a computer program of the fifth or sixth aspect.

According to an eighth aspect, there is provided an apparatus for enabling uplink power control in a wireless network. The apparatus comprises an assigning module for assigning a transmit power for downlink transmission of a reference signal, wherein the reference signal is to be used for power control of at least one uplink transmission. The apparatus also comprises a determination module for determining a reference signal transmit power parameter providing a fictitious value for the transmit power of the reference signal that is different from the assigned transmit power. The apparatus further comprises an output module for outputting the reference signal transmit power parameter for transmission to at least one wireless device to enable the wireless device(s) to perform transmit power determination for the uplink transmission(s) at least partly based on the fictitious value for the transmit power of the reference signal.

According to a ninth aspect, there is provided an apparatus for uplink power control in a wireless network. The apparatus comprises an estimation module for estimating a received power of a received reference signal, the reference signal being transmitted from a network node with a transmit power. The apparatus also comprises an input module for receiving a reference signal transmit power parameter providing a fictitious value for the transmit power of the reference signal that is different from the actual transmit power of the reference signal. The apparatus further comprises a determination module for determining a transmit power for uplink transmission at least partly based on the estimated received power and the fictitious value for the transmit power of the reference signal.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
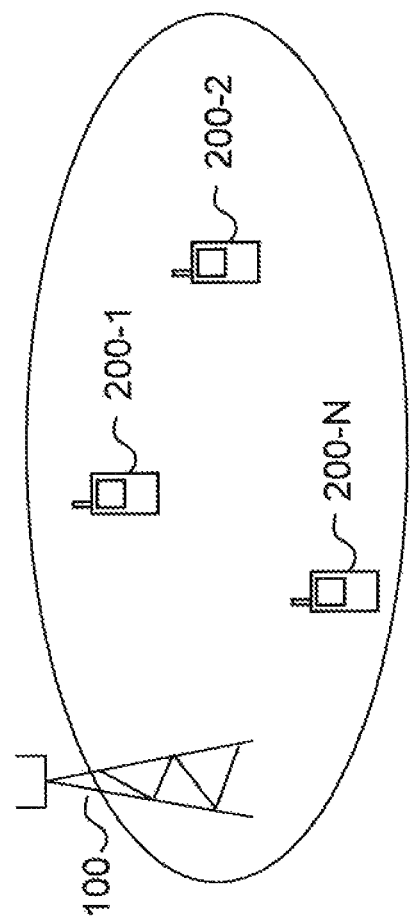
FIG. 1 is a schematic diagram illustrating a simplified example of a wireless network.

For a better understanding of the proposed technology, it may be useful to begin with a brief overview of a wireless network with reference to FIG. 1.

FIG. 1 is a schematic diagram illustrating a simplified example of a wireless network. The network comprises a network node 100 such as a base station or the like communicating with a number, N, of wireless devices 200-1, . . . 200-N, such as mobile terminals or User Equipments, UEs.

As used herein, the non-limiting term "network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

As used herein, the non-limiting terms "wireless device" and "User Equipment" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPad, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As mentioned, it is desirable to provide improved mechanisms for uplink power control.

For example, with the increased complexity of network deployment scenarios such as Heterogeneous Networks, HetNets, and indoor deployments, power control like many other functions is facing new requirements and challenges. One such challenge in indoor deployment is that the Distributed Antenna System, DAS, and Radio Dot System, RDS, deployment introduce a higher uplink loss or higher noise floor than typically seen in outdoor deployments. The increased capacity also requires higher Signal-to-Interference-and-Noise Ratio, SINR. In order to compensate the higher loss or noise floor and obtain high enough SINR, the uplink power settings need to be increased to a level higher than what is currently defined as maximum received target power.

Figure 2:
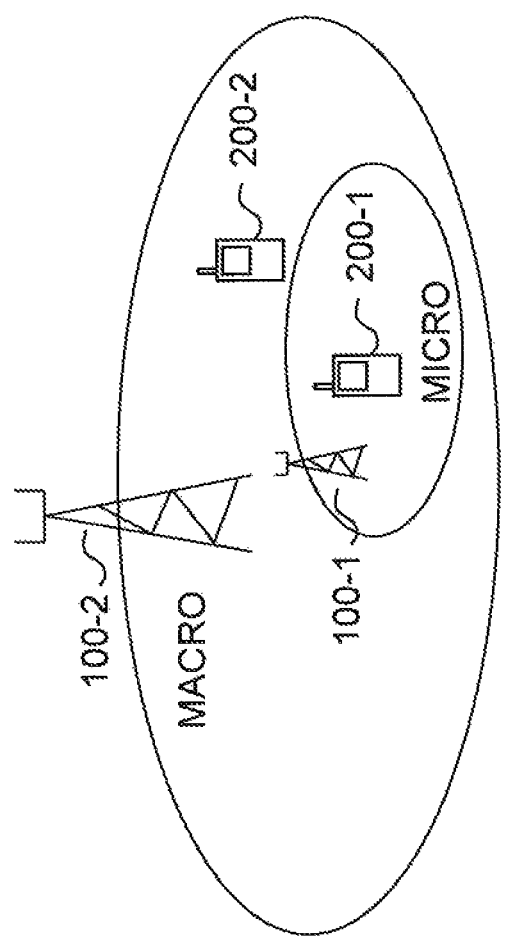
FIG. 2 is a schematic diagram illustrating an example of a wireless heterogeneous network comprising a macro cell and a micro cell.

Another scenario can be found in HetNet deployments, where a first UE, 200-1, located at the edge of a micro/pico cell served by a first base station or access point 100-1, and a second UE, 200-2, located close to the first UE but in a macro cell served by a second base station or access point 100-2, as shown in FIG. 2.

While the first UE 200-1 and the second UE 200-2 have balanced downlink power settings, when it comes to the uplink, the second UE 200-2 in the macro cell normally sends with higher output power due to higher pathloss than that of the first UE in the micro/pico cell. This in turn introduces high interference to the first UE 200-1. As a result, the first UE 200-1 also needs to apply a higher uplink power setting than otherwise needed for its uplink transmission.

Both scenarios point to new requirements or challenges to uplink power control:

The UE may need to increase the uplink power to a level higher than maximum defined target power, e.g. valid for indoor deployment.

The UE may need to increase the uplink power further than the level calculated based on conventional uplink power control, e.g. valid for HetNet deployment.

The new power setting requirements apply to several uplink physical channels such as PUSCH, PUCCH and PRACH altogether.

Current solutions to tackle the abovementioned challenges include:

For indoor deployment, increase the defined maximum target power for PUSCH and PUCCH respectively in closed loop and instruct the UE to loop more times to reach a higher target power.

For Hetnet deployment, apply Uplink Coordinated Multipoint transmission, UL COMP, to compensate for the unbalanced PUSCH channel.

However, as pointed out earlier, the closed loop solution has some limitations:

It introduces extra loops of power adjustment, thus increasing the delay to reach proper power settings.

It needs to apply the change, such as increased maximum target power, to PUSCH and PUCCH separately, which introduces considerable complexity.

It cannot impact PRACH where only open loop power control can be applied.

The UL COMP solution applies only to PUSCH and does not provide feasible adjustment for PUCCH and PRACH.

The proposed technology offers a novel solution for fast and efficient uplink power control.

Figure 3:
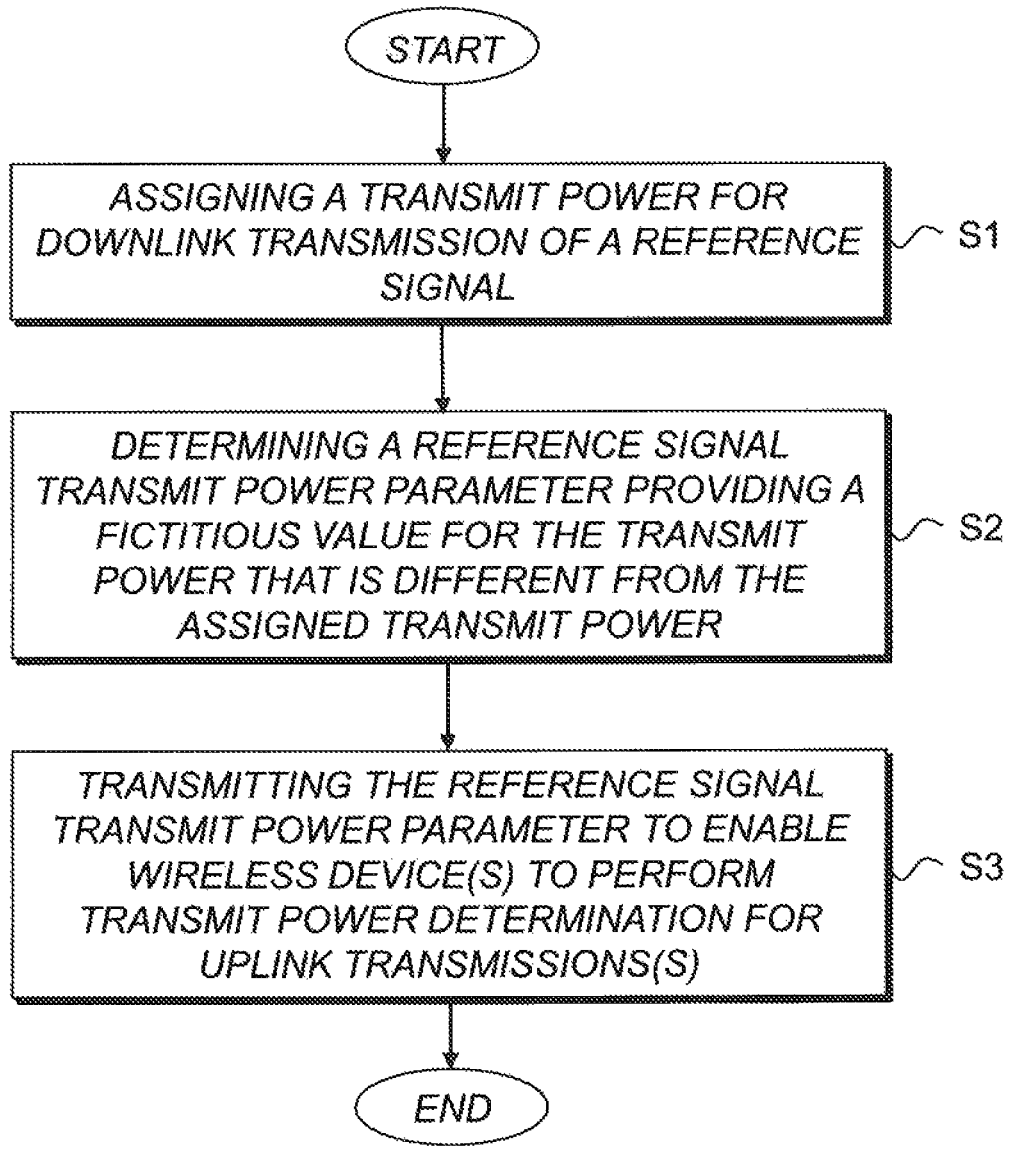
FIG. 3 is a schematic flow diagram illustrating an example of a method for enabling uplink power control in a wireless network.

FIG. 3 is a schematic flow diagram illustrating an example of a method, performed by a network node, for enabling uplink power control in a wireless network. The method comprises the following steps of:

S1: Assigning a transmit power for downlink transmission of a reference signal, wherein the reference signal is to be used for power control of at least one uplink transmission.

S2: Determining a reference signal transmit power parameter providing a fictitious value for the transmit power of the reference signal that is different from the assigned transmit power.

S3: Transmitting the reference signal transmit power parameter to at least one wireless device to enable the wireless device(s) to perform transmit power determination for the uplink transmission(s) at least partly based on the fictitious value for the transmit power of the reference signal.

By introducing a controlled discrepancy between the information that the network node sends to the wireless device(s) regarding the transmit power of the reference signal and the actual transmit power that the network node uses for the reference signal transmission, it is possible to provide efficient uplink power control. In particular, the uplink power can be controlled to reach a desired power level with lower delay and/or with improved granularity. For example, the number of loops for adjustment of the power introduced by a closed loop procedure may be reduced and/or avoided. The wireless device is also allowed to converge to a desired power level on all relevant uplink physical channels at the same time.

By way of example, as will be explained in detail later on, the transmit power determinations for the uplink transmission(s) on the UE side may be based on pathloss calculations, where the fictitious value for the transmit power of the reference signal may be used as input together with a corresponding estimate of reference signal received power.

As an example, the reference signal transmit power parameter may indicate a fictitious value for the transmit power of the reference signal that is higher than the assigned transmit power.

With reference to the pathloss calculation(s) by the wireless device, a higher fictitious value of the transmit power would result in an overestimation of the pathloss, which would result in higher power for the uplink transmission(s) in a fast and efficient manner.

Alternatively, the reference signal transmit power parameter may indicate a fictitious value for the transmit power of the reference signal that is lower than the assigned transmit power.

With reference to the pathloss calculation(s) by the wireless device, a lower fictitious value of the transmit power would result in an underestimation of the pathloss, which would result in lower power for the uplink transmission(s), leading to lower overall interference in the network.

In a particular example, the reference signal transmit power parameter is a cell-dependent parameter that enables uplink power control for multiple wireless devices in a cell of the wireless network.

The reference signal transmit power parameter may be determined in a variety of ways, e.g. by means of a delta value, scaling factor and/or with the use of any linear or non-linear function, using different types of input.

Figure 4:
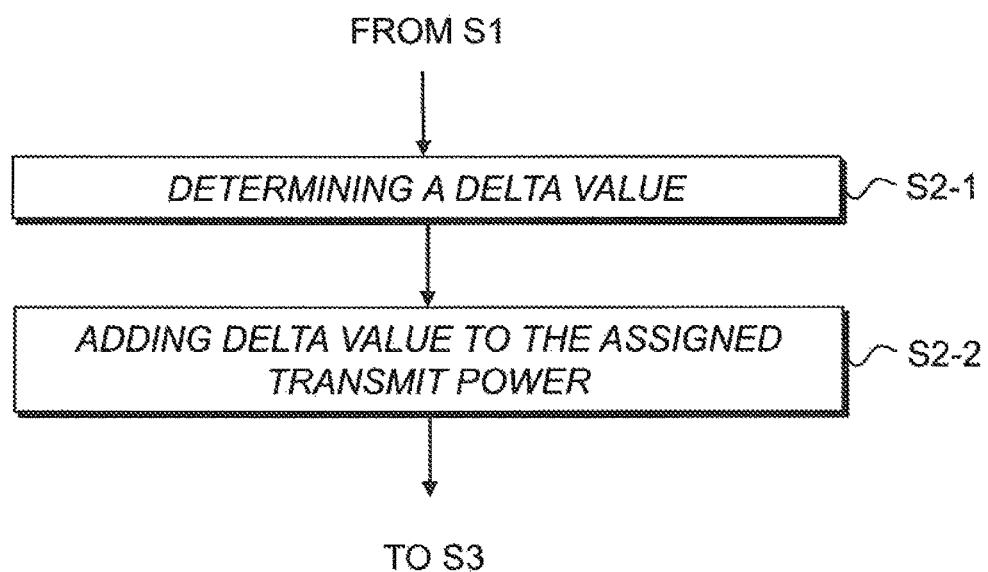
FIG. 4 is a schematic flow diagram illustrating a non-limiting example of how the reference signal transmit power parameter can be determined.

FIG. 4 is a schematic flow diagram illustrating a non-limiting example of how the reference signal transmit power parameter can be determined. In this example, the step S2 of determining a reference signal transmit power parameter providing a fictitious value for the transmit power of the reference signal that is different from the assigned transmit power comprises the steps of determining, in step S2-1, a delta value and adding, in step S2-2, this delta value to the assigned transmit power.

By way of example, the delta value may be selected to compensate for a noise floor difference.

For example, the noise floor difference may be representative of a difference between an indoor noise floor and an outdoor noise floor.

In a particular example, the reference signal transmit power parameter is transmitted in a referenceSignalPower information element.

As an example, the reference signal transmit power parameter may be transmitted via Radio Resource Control, RRC, and/or System Information Block, SIB, signaling.

The proposed technology is generally applicable for enabling uplink power control in wireless networks.

In a non-limiting example, the wireless network may be based on Long Term Evolution, LTE, and the reference signal transmit power parameter then enables power control for Physical Uplink Shared Channel, PUSCH, Physical Uplink Control Channel PUCCH and/or Physical Random Access Channel, PRACH.

In another non-limiting example, the method may be used for indoor deployments and/or heterogeneous networks, HetNets.

For example, the network node may be a radio base station.

The reference signal transmit power parameter may be transmitted to at least one User Equipment, UE, to enable the UE(s) to perform transmit power determination for the uplink transmission(s) at least partly based on the reference signal transmit power parameter.

Figure 5:
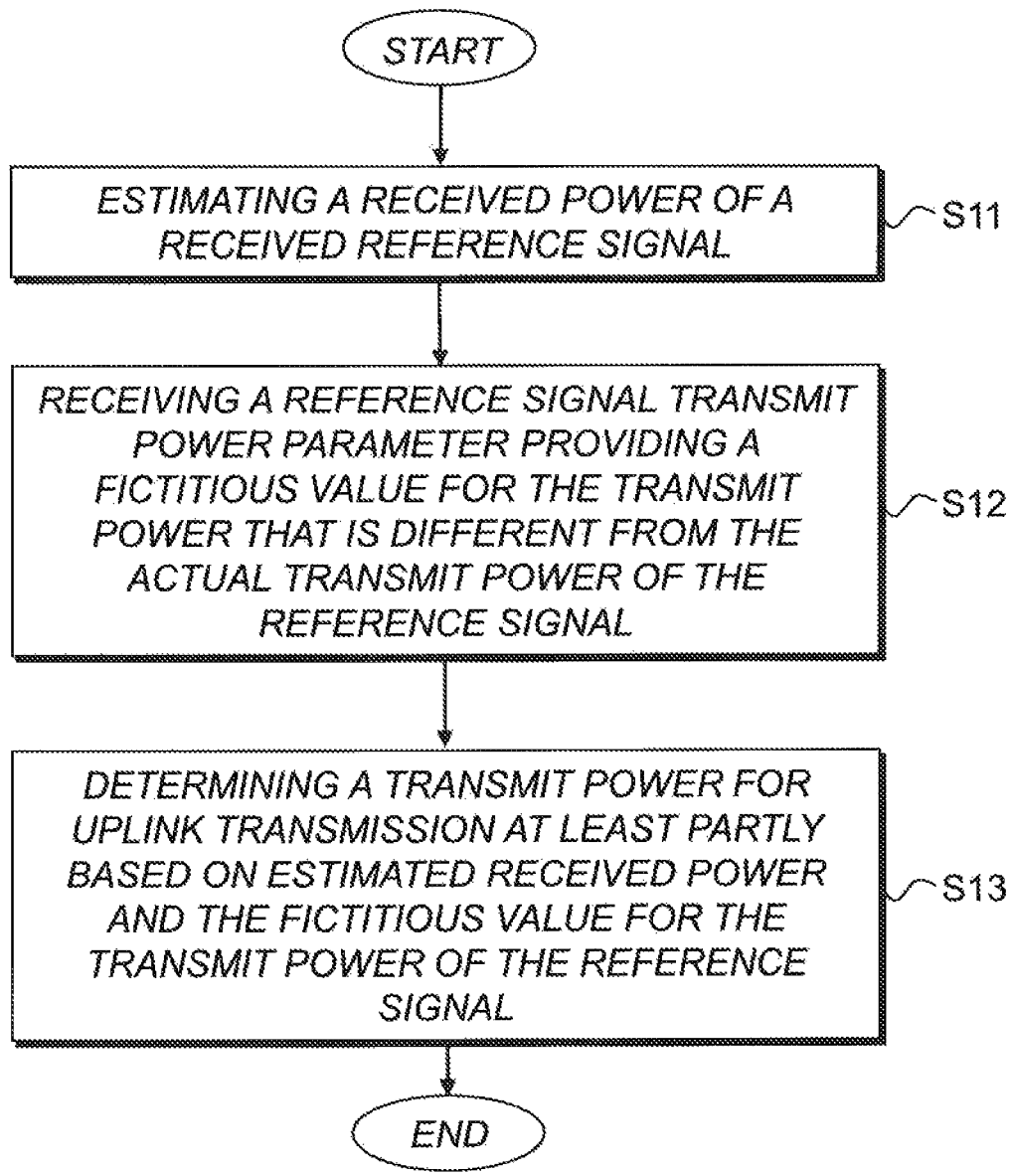
FIG. 5 is a schematic flow diagram illustrating an example of a method for uplink power control in a wireless network.

FIG. 5 is a schematic flow diagram illustrating an example of a method, performed by a wireless device, for uplink power control in a wireless network. The method comprises the following steps of:

S11: Estimating a received power of a received reference signal, the reference signal being transmitted from a network node with a transmit power.

S12: Receiving a reference signal transmit power parameter providing a fictitious value for the transmit power of the reference signal that is different from the actual transmit power of the reference signal.

S13: Determining a transmit power for uplink transmission at least partly based on the estimated received power and the fictitious value for the transmit power of the reference signal.

Figure 6:
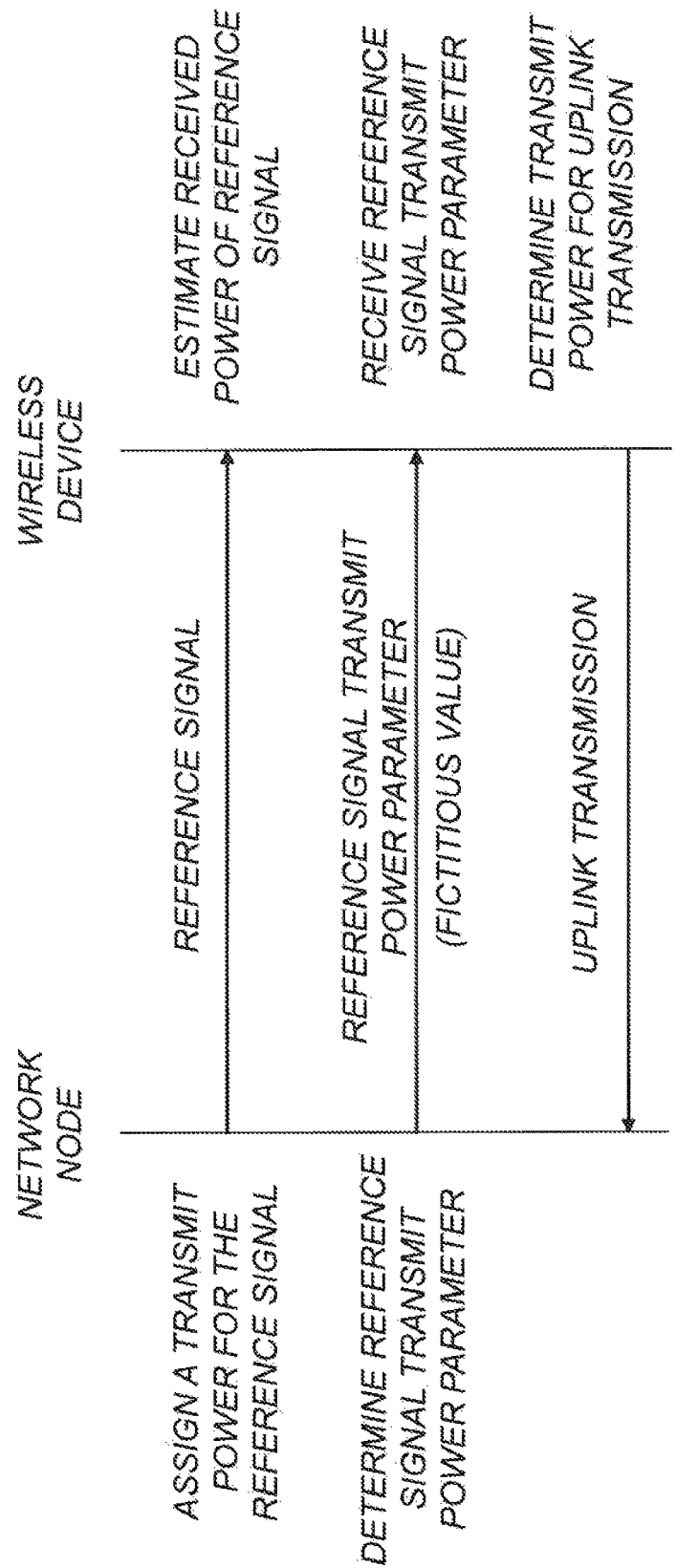
FIG. 6 is a schematic signaling diagram illustrating an example of signaling between a network node and a wireless device and corresponding actions.

FIG. 6 is a schematic signaling diagram illustrating an example of signaling between a network node and a wireless device and corresponding actions.

In this example, the network node assigns a transmit power for the reference signal and transmits the reference signal with the assigned transmit power. The wireless device receives the reference signal, and estimates the received power.

The network node also determines a reference signal transmit power parameter indicating the fictitious value of the transmit power, and sends this transmit power parameter to the wireless device.

The wireless device receives the reference signal transmit power parameter, and determines the transmit power for uplink transmission at least partly based on the estimated received power and the fictitious value for the transmit power of the reference signal, and then performs the uplink transmission accordingly.

For a better understanding, the proposed technology will now be described with reference to particular non-limiting examples including a greater level of detail.

With reference to LTE, the technical specification [1] defines the basic procedures for power control in LTE according to the following calculations and definitions:

PUSCH:

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [dBm]$$

where:

$P_{CMAX,c}(i)$ is the configured UE transmit power in subframe i for serving cell c.

$M_{PUSCH,c}(i)$ is the bandwidth of the PUSCH resource assignment expressed in number of resource blocks valid for subframe i and serving cell c.

$P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c.

For j=0 or 1, $\alpha_c \in \{0, 0.4, 0.5, 0.6, 0.7, 0.8, 0.9, 1\}$ is a 3-bit parameter provided by higher layers for serving cell c. For j=2, $\alpha_c(j)=1$.

$PL_c$ is the downlink pathloss estimate calculated in the UE for serving cell c in dB:

$PL_c$=referenceSignalPower−higher layer filtered RSRP, where referenceSignalPower is provided by higher layers and RSRP is the Reference Signal Received Power for the reference serving cell and the higher layer filter configuration is defined for the reference serving cell. The serving cell chosen as the reference serving cell and used for determining referenceSignalPower and higher layer filtered RSRP is configured by the higher layer parameter pathlossReferenceLinking.

$\Delta_{TF,c}(i)=10 \log_{10}((2^{BPRE \cdot K_s}-1) \cdot \beta_{offset}^{PUSCH})$ for $K_S=1.25$ and 0 for $K_S=0$ where $K_S$ is given by the parameter deltaMCS-Enabled provided by higher layers for each serving cell c.

$f_c(i)=f_c(i-1)+\delta_{PUSCH,c}(i-K_{PUSCH})$ if accumulation is enabled based on the parameter Accumulation-enabled provided by higher layers or if the TPC command $\delta_{PUSCH,c}$ is included in a PDCCH with DCI format 0 for serving cell c where the CRC is scrambled by the Temporary C-RNTI, or $f_c(i)=\delta_{PUSCH,c}(i-K_{PUSCH})$ if accumulation is not enabled for serving cell c based on the parameter Accumulation-enabled provided by higher layers, where $\delta_{PUSCH,c}$ is a correction value, also referred to as a TPC command and is included in PDCCH with DCI format 0/4 for serving cell c or jointly coded with other TPC commands in PDCCH with DCI format 3/3A whose CRC parity bits are scrambled with TPC-PUSCH-RNTI.

PUCCH:

$$P_{PUCCH}(i) = \min\left\{\begin{array}{l} P_{CMAX,c}(i), \\ P_{0\_PUCCH}+PL_c+h(n_{CQI},n_{HARQ},n_{SR})+ \\ \Delta_{F\_PUCCH}(F)+\Delta_{TxD}(F')+g(i) \end{array}\right\}[dBm]$$

where:

$P_{CMAX,c}(i)$ is the configured UE transmit power in subframe i for serving cell c.

$P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers.

$h(n_{CQI}, n_{HARQ}, n_{SR})$ is a PUCCH format dependent value.

$\Delta_{F\_PUCCH}(F)$ is provided by higher layers. Each $\Delta_{F\_PUCCH}(F)$ value corresponds to a PUCCH format (F) relative to PUCCH format 1a, where each PUCCH format (F) is defined in Table 5.4-1 of [2].

If the UE is configured by higher layers to transmit PUCCH on two antenna ports, the value of $\Delta_{TxD}(F')$ is provided by higher layers where each PUCCH format F' is defined in Table 5.4-1 of [2]; otherwise, $\Delta_{TxD}(F')=0$.

$$g(i) = g(i-1) + \sum_{m=0}^{M-1} \delta_{PUCCH}(i-k_m)$$

where g(i) is the current PUCCH power control adjustment state and where g(0) is the first value after reset, and $\delta_{PUCCH}$ is a UE specific correction value, also referred to as a TPC command, included in a PDCCH with DCI format 1A/1B/1D/1/2A/2/213/2C for the primary cell or sent jointly coded with other UE specific PUCCH correction values on a PDCCH with DCI format 3/3A whose CRC parity bits are scrambled with TPC-PUCCH-RNTI.

PRACH:

$P_{PRACH}=\min\{P_{CMAX,c}(i), PREAMBLE\_RECEIVED\_TARGET\_POWER+PL_c\}\_[dBm]$, where $P_{CMAX,c}(i)$ is the configured UE transmit power for subframe i of the primary cell and $PL_c$ is the downlink pathloss estimate calculated in the UE for the primary cell.

It is clear from the definition of the power setting for PUSCH, PUCCH and PRACH that PUSCH and PUCCH has both open loop and closed loop components in the calculation while PRACH only has open loop components.

From the definition of PUSCH, PUCCH and PRACH power control, the inventors have recognized that a common component that impacts power settings of all three uplink channels is $PL_c$, the downlink pathloss estimate calculated in the UE for serving cell c in dB:

$PL_c$=referenceSignalPower−higher layer filtered RSRP, where referenceSignalPower is provided by higher layers and RSRP is the Reference Signal Received Power for the reference serving cell and the higher layer filter configuration is defined for the reference serving cell.

Normally, the parameter referenceSignalPower reflects the real power used by the eNB to transmit the reference signal. When the UE measures the received power of the reference in form of e.g. RSRP, the UE can then compare the two power values and calculate the downlink pathloss. The pathloss value will be used as input for power adjustment for open loop power control.

Once again, reference can be made to the power control formulas for PUSCH, PUCCH and PRACH:

$$P_{PUSCH,c}(i) = \min\left\{\begin{array}{l} P_{CMAX,c}(i), \\ 10\log_{10}(M_{PUSCH,c}(i))+P_{O\_PUSCH,c}(j)+ \\ \alpha_c(j) \cdot PL_c + \Delta_{TF,c}(i) + f_c(i) \end{array}\right\}$$

$$P_{PUCCH}(i) = \min\left\{\begin{array}{l} P_{CMAX,c}(i), \\ P_{0\_PUCCH}+PL_c+h(n_{CQI},n_{HARQ},n_{SR})+ \\ \Delta_{F\_PUCCH}(F)+\Delta_{TxD}(F')+g(i) \end{array}\right\}$$

$$P_{PRACH} = \min\{P_{CMAX,c}(i), PREAMBLE\_RECEIVED\_TARGET\_POWER + PL_c\}$$

As previously indicated, the proposed technology can be applied to PUSCH, PUCCH and PRACH to reach optimal uplink power settings with very low delay. An idea is to guide the UE(s) to calculate a higher or lower pathloss value by introducing a controlled discrepancy between the information that the eNB sends to the UE regarding the power used to transmit the reference signal and the actual power that the eNB uses for the reference signal transmission when applicable.

As previously indicated, the eNB or equivalent network node determines a fictitious value for the transmit power of the reference signal that is different from the assigned transmit power, and transmits this value to the UE side.

By way of example, in order for the UE to reach a higher power setting without changing the maximum defined P0 for PUSCH, PUCCH and PRACH, one approach is to guide the UE to calculate a higher $PL_c$. This will lead the UE to calculate a more conservative downlink pathloss and converge faster to a higher power for all PUSCH, PUCCH and PRACH. By doing that, the power settings of PUSCH, PUCCH and PRACH can all increase more without changing P0 for any of the channels, and they all can converge to the optimal power settings with lower delay.

This may be achieved by the eNB or equivalent network node sending a value of the parameter referenceSignalPower that is higher than the power actually used for reference signal transmission. The estimate of received power such as the filtered RSRP remains unchanged and as a result the pathloss estimate $PL_c$ becomes higher. The gap between referenceSignalPower and the power actually used for reference signal transmission can be controlled by the eNB, and will thereby determine how conservative the calculated pathloss on the UE side should be. This will give a very good control over how much higher above the defined maximum P0 the uplink power settings can go and how fast the power settings will converge.

The proposed technology provides, but is not limited to, at least one of the following benefits:

Allows the UE to converge to higher power on all uplink physical channels such as PUSCH, PUCCH and PRACH at the same time.

Decreases the delay needed to reach an optimal power level.

Provides controllable granularity on if and/or how fast the power setting should converge.

Introduces no extra impact on current P0 settings of PUSCH, PUCCH and PRACH.

Alternatively, a lower pathloss estimate can be obtained by sending a value of the parameter referenceSignalPower that is lower than the power actually used for reference signal transmission. Naturally, this results in lower power for the uplink transmission(s), leading to lower overall interference in the network.

In other words, the eNB can impact and adjust how the downlink pathloss is calculated in the UE and as a consequence the power control can also be controlled to reach desired level with lower delay with a controlled granularity.

Figure 7:
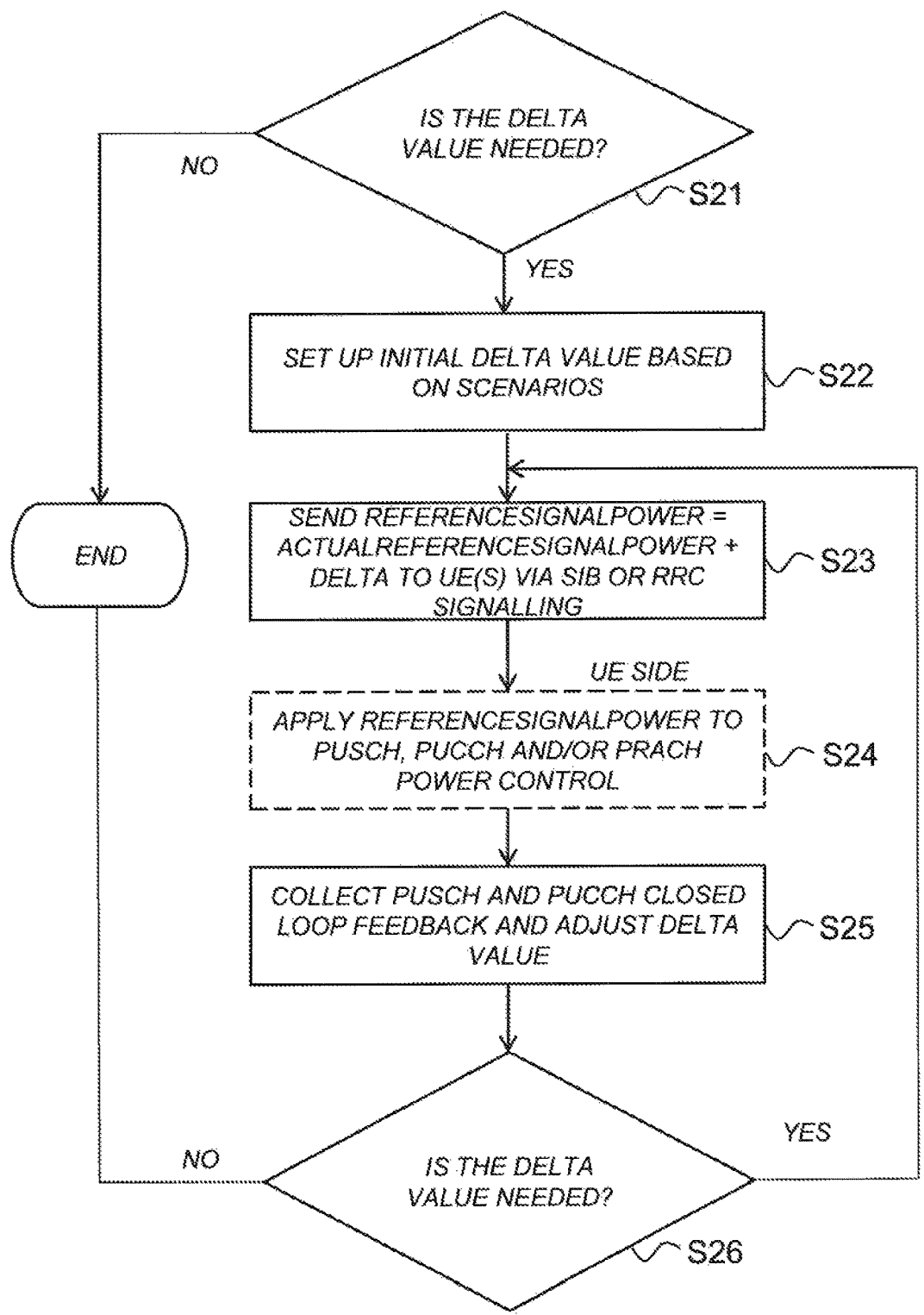
FIG. 7 is a schematic diagram illustrating a non-limiting example of a method for enabling uplink power control.

FIG. 7 is a schematic diagram illustrating a non-limiting example of a method for enabling uplink power control.

S21: Determine if the delta between referenceSignalPower and the actual transmission power is needed. The solution may be scenario dependent and can be switched on and off.

S22: Choose a proper delta value to start with. The delta value impacts the power setting levels as well as the convergence speed. For indoor deployment scenario, where there is a constant higher noise floor, the delta value can be set to compensate the difference between indoor noise floor and outdoor noise floor. For Hetnet scenario, the micro/pico cell can introduce a delta value so that UEs in the micro/pico cell can apply an uplink power setting higher than what otherwise is not possible to achieve with a lower delay.

S23: Send the adjusted referenceSignalPower=actualReferenceSignalPower+delta to UEs, e.g. via SIB update or RRC signaling. This will trigger the UE to start using the controlled reference signal power to calculate pathloss.

S24: Apply the adjusted reference signal power to power control calculations on the UE side for PUSCH, PUCCH and/or PRACH at the same time. The open loop component of all PUSCH, PUCCH and PRACH can be adjusted at the same time to reach desired power levels.

S25: Collect closed loop feedback, and adjust the delta value based on the closed loop feedback. For example, the delta value can be adjusted based on PUSCH and PUCCH closed loop power control feedback and re-applied to all PUSCH, PUCCH and PRACH to achieve a better and more stable performance.

S26: Once again, check if the delta value is needed. If yes, then re-iterate steps S23 to S25.

It should be understood that the delta value adjustment is performed on the network side such that an "adjusted" reference signal transmit power parameter is provided. The adjusted reference signal transmit power parameter indicates a fictitious value for the transmit power of the reference signal that is different from the assigned transmit power.

Reference [3] concerns path loss compensation to improve the accuracy of a UE in calculating an uplink transmit power. The base station calculates a path loss adjustment factor specifically for a UE, and sends the adjustment factor itself to the UE.

There are at least two key differences between the proposed technology and the teachings of reference [3].

First, the proposed technology determines a reference signal transmit power parameter providing a fictitious value for the transmit power of the reference signal that is different from the assigned transmit power. This is the transmit power value that the base station wants the UE to use for the transmit power calculations. This value can be transmitted to the UE in an existing parameter in standardized signaling such as the referenceSignalPower, parameter, and the proposed technology can thus offer a completely transparent solution.

Reference [3] on the other hand, determines a special pathloss adjustment factor PA and sends the adjustment factor PA to the UE side to enable a specific UE to perform pathloss compensation. The adjustment factor is not a transmit power value. It is also a new information element that needs to be conveyed from the base station to the UE side.

Moreover, the reference signal transmit power parameter of the proposed technology is valid for all UEs in a given cell, whereas the pathloss adjustment proposed in reference [3] is individual for each UE.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The proposed technology provides a network node configured to enable uplink power control in a wireless network. The network node is configured to assign a transmit power for downlink transmission of a reference signal, wherein the reference signal is to be used for power control of at least one uplink transmission. The network node is also configured to determine a reference signal transmit power parameter providing a fictitious value for the transmit power of the reference signal that is different from the assigned transmit power. The network node is configured to transmit the reference signal transmit power parameter to at least one wireless device to enable the wireless device(s) to perform transmit power determination for the uplink transmission(s) at least partly based on the fictitious value for the transmit power of the reference signal.

By way of example, the network node is configured to determine the reference signal transmit power parameter indicating a fictitious value for the transmit power of the reference signal that is higher than the assigned transmit power.

Alternatively, the network node is configured to determine the reference signal transmit power parameter indicating a fictitious value for the transmit power of the reference signal that is lower than the assigned transmit power.

For example, the network node is configured to determine the reference signal transmit power parameter as a cell-dependent parameter that enables uplink power control for multiple wireless devices in a cell of the wireless network.

In a particular example, the network node is configured to determine the reference signal transmit power parameter providing a fictitious value for the transmit power of the reference signal that is different from the assigned transmit power by determining a delta value and adding this delta value to the assigned transmit power.

As an example, the network node is configured to determine the delta value to compensate for a noise floor difference.

For example, the network node may be configured to determine the delta value to compensate for a noise floor difference that is representative of a difference between an indoor noise floor and an outdoor noise floor.

In a particular example, the network node may be configured to transmit the reference signal transmit power parameter in a referenceSignalPower information element.

The network node may be configured to transmit the reference signal transmit power parameter via Radio Resource Control, RRC, and/or System Information Block, SIB, signaling.

For example, the wireless network may be based on Long Term Evolution, LTE, and the reference signal transmit power parameter thus enables power control for uplink physical channels such as Physical Uplink Shared Channel, PUSCH, Physical Uplink Control Channel PUCCH and/or Physical Random Access Channel, PRACH.

In a particular example, the network node is a radio base station.

The proposed technology also provides a wireless device configured for uplink power control in a wireless network. The wireless device is configured to estimate a received power of a received reference signal, the reference signal being transmitted from a network node with a transmit power. The wireless device is also configured to receive a reference signal transmit power parameter providing a fictitious value for the transmit power of the reference signal that is different from the actual transmit power of the reference signal. The wireless device is further configured to determine a transmit power for uplink transmission at least partly based on the estimated received power and the fictitious value for the transmit power of the reference signal.

In a particular example, the wireless device is a User Equipment, UE.

Figure 8:
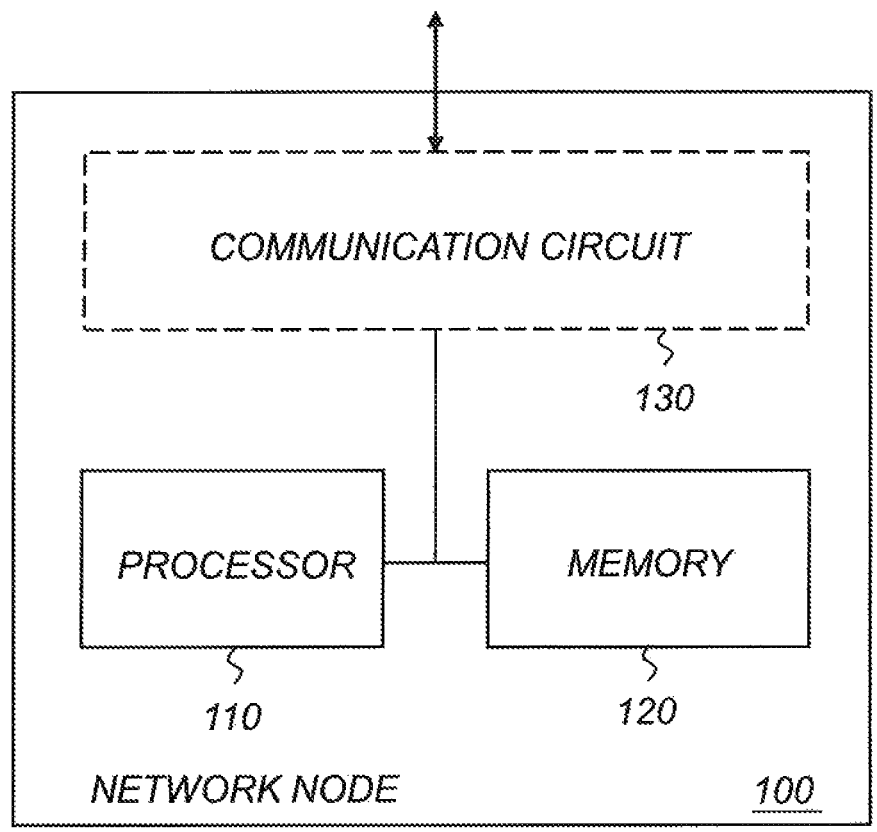
FIG. 8 is a schematic block diagram illustrating an example of a network node according to an embodiment.

FIG. 8 is a schematic block diagram illustrating an example of a network node according to an embodiment.

In a particular example, the network node 100 comprises a processor 110 and a memory 120, the memory 120 comprising instructions executable by the processor 110, whereby the processor 110 is operative to perform uplink power control.

Optionally, the network node 100 may also include a communication circuit 130. The communication circuit 130 may include functions for wired and/or wireless communication with other devices and/or network nodes in the network. In a particular example, the network node 100 may include radio circuitry for communication with one or more other nodes, including transmitting and/or receiving information. The communication circuit 130 may be interconnected to the processor 110 and/or memory 120.

Figure 9:
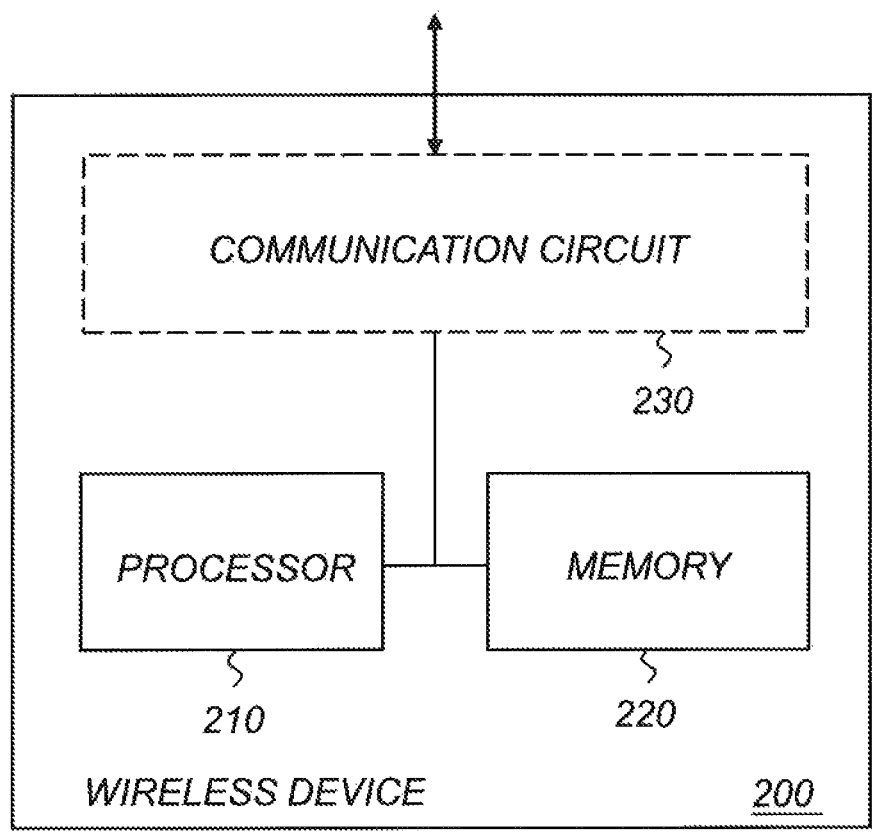
FIG. 9 is a schematic block diagram illustrating an example of a wireless device according to an embodiment.

FIG. 9 is a schematic block diagram illustrating an example of a wireless device according to an embodiment.

In a particular example, the wireless device 200 comprises a processor 210 and a memory 220, the memory 220 comprising instructions executable by the processor 210, whereby the processor 210 is operative to perform uplink power control.

Optionally, the wireless device 200 may also include a communication circuit 230 having radio circuitry for communication with one or more other nodes, including transmitting and/or receiving information. The communication circuit 230 may be interconnected to the processor 210 and/or memory 220.

Figure 10:
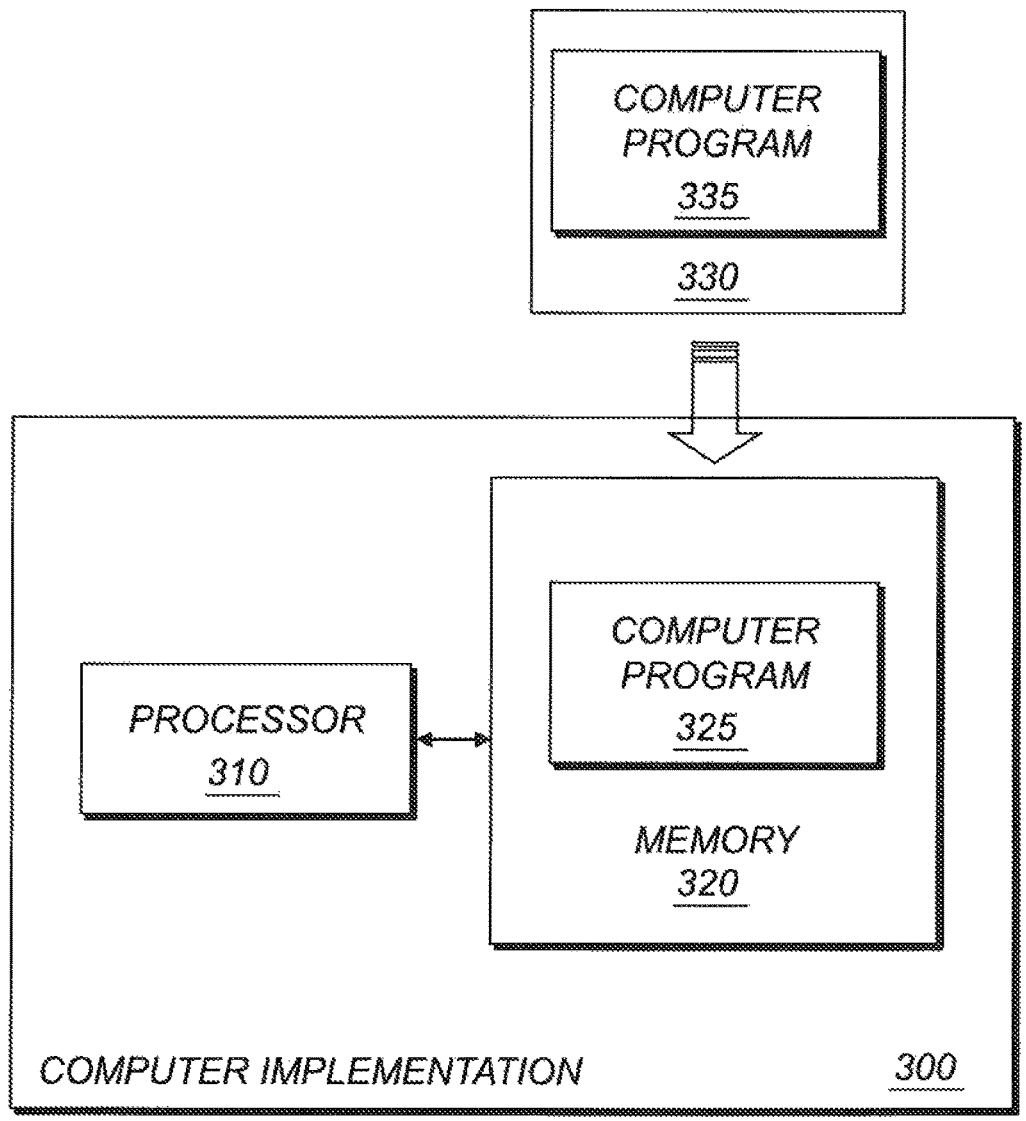
FIG. 10 is a schematic block diagram illustrating an example of a computer implementation according to an embodiment.

FIG. 10 is a schematic block diagram illustrating an example of a computer implementation according to an embodiment.

In this particular example, at least some of the steps, functions, procedures, modules and/or blocks described herein are implemented in a computer program 325, 335, which is loaded into the memory 320 for execution by processing circuitry including one or more processors 310. The processor(s) 310 and memory 320 are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program comprises instructions, which when executed by at least one processor, cause the processor(s) to:

assign a transmit power for downlink transmission of a reference signal, wherein the reference signal is to be used for power control of at least one uplink transmission;

determine a reference signal transmit power parameter providing a fictitious value for the transmit power of the reference signal that is different from the assigned transmit power; and prepare the reference signal transmit power parameter for transmission to at least one wireless device to enable the wireless device(s) to perform transmit power determination for the uplink transmission(s) at least partly based on the fictitious value for the transmit power of the reference signal.

Figure 11A:
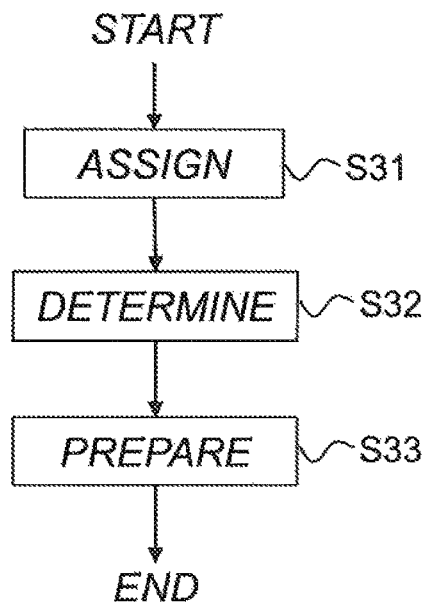
FIG. 11A is a schematic computer flow diagram illustrating an example of a method for computer implementation.

FIG. 11A is a schematic computer flow diagram illustrating an example of a method for computer implementation involving the above basic steps to assign S31 a transmit power, determine S32 a reference signal transmit power parameter, and prepare S33 the reference signal transmit power parameter for transmission.

In a complementary embodiment, the computer program comprises instructions, which when executed by at least one processor, cause the processor(s) to:

estimate a received power of a received reference signal, the reference signal being transmitted from a network node with a transmit power;

receive a reference signal transmit power parameter providing a fictitious value for the transmit power of the reference signal that is different from the actual transmit power of the reference signal;

determine a transmit power for uplink transmission at least partly based on the estimated received power and the fictitious value for the transmit power of the reference signal.

Figure 11B:
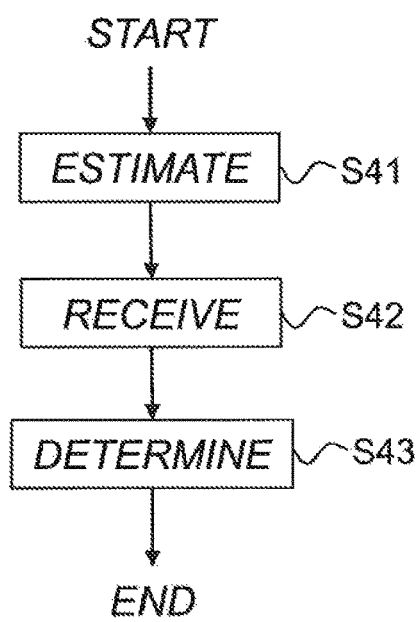
FIG. 11B is a schematic computer flow diagram illustrating an example of another method for computer implementation.

FIG. 11B is a schematic computer flow diagram illustrating an example of another method for computer implementation involving the above basic steps to estimate S41 a received power of a received reference signal, receive S42 a reference signal transmit power parameter providing a fictitious value for the transmit power, and determine S43 a transmit power for uplink transmission.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 325; 335 may be realized as a computer program product, which is normally carried or stored on a computer-readable medium 320; 330, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagrams presented herein may be regarded as computer flow diagrams, when performed by one or more processors. A corresponding apparatus may thus be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 12:
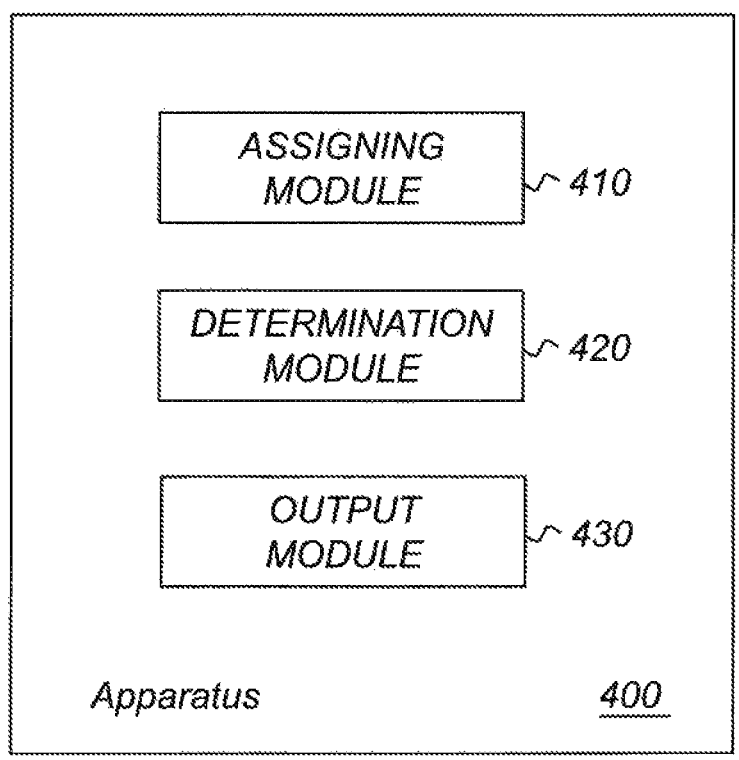
FIG. 12 is a schematic block diagram illustrating an example of an apparatus for enabling uplink power control in a wireless network according to an embodiment.

FIG. 12 is a schematic block diagram illustrating an example of an apparatus for enabling uplink power control in a wireless network according to an embodiment. The apparatus 400 comprises:

an assigning module 410 for assigning a transmit power for downlink transmission of a reference signal, wherein the reference signal is to be used for power control of at least one uplink transmission;

a determination module 420 for determining a reference signal transmit power parameter providing a fictitious value for the transmit power of the reference signal that is different from the assigned transmit power; and an output module 430 for outputting the reference signal transmit power parameter for transmission to at least one wireless device to enable the wireless device(s) to perform transmit power determination for the uplink transmission(s) at least partly based on the fictitious value for the transmit power of the reference signal.

Figure 13:
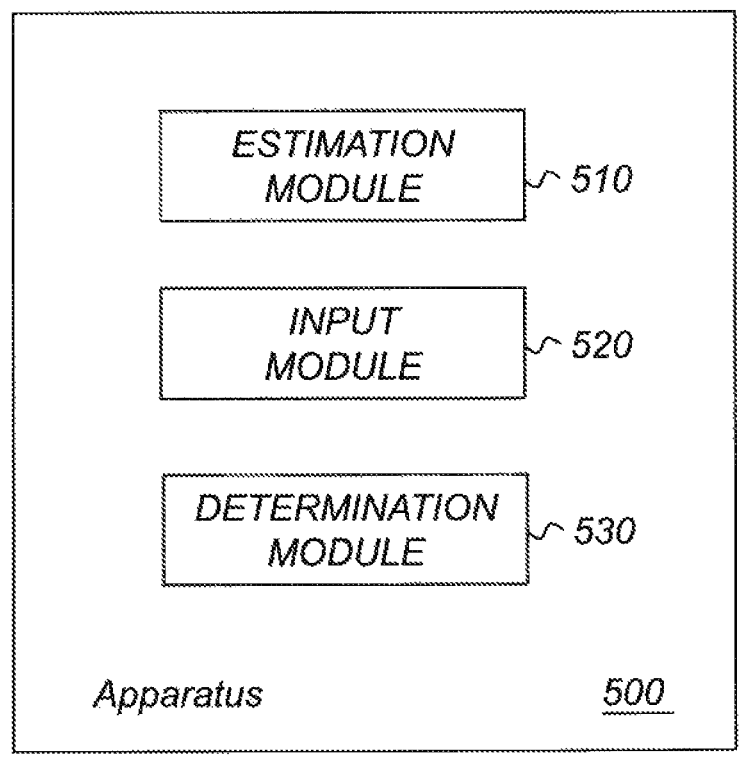
FIG. 13 is a schematic block diagram illustrating an example of an apparatus for uplink power control in a wireless network according to an embodiment.

FIG. 13 is a schematic block diagram illustrating an example of an apparatus for uplink power control in a wireless network according to an embodiment. The apparatus 500 comprises:

an estimation module 510 for estimating a received power of a received reference signal, the reference signal being transmitted from a network node with a transmit power;

an input module 520 for receiving a reference signal transmit power parameter providing a fictitious value for the transmit power of the reference signal that is different from the actual transmit power of the reference signal;

a determination module 530 for determining a transmit power for uplink transmission at least partly based on the estimated received power and the fictitious value for the transmit power of the reference signal.

Alternatively it is possibly to realize the modules in FIGS. 12 and 13 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits, ASICs, as previously mentioned. The extent of software versus hardware is purely an implementation selection.

With reference once again to FIG. 12, the assigning module 410 and the determination module 420 may alternatively be implemented in hardware such as electronic circuitry, e.g. one or more ASICs. The output module 430 may alternatively be implemented as the output part of an I/O circuit, and/or a radio transmitter. For example, the assigning module 410 is interconnected to the determination module 420, which in turn is connected to the output module 430.

With reference once again to FIG. 13, the estimation module 510 may be implemented as a power estimator in connection with a radio receiver, where the power estimator may be implemented in hardware such as electronic circuitry, e.g. one or more ASICs. The input module 520 may be implemented as the input part of an I/O circuit, and/or as a radio receiver. The determination module 530 may be implemented in hardware such as electronic circuitry, e.g. one or more ASICs. For example, the estimation module 510 and the input module 520 are each interconnected to the determination module 530.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] 3GPP TS 36.213, Chapter 5.1, Version 10.12.0, Release 10
[2] 3GPP TS 36.211, Chapter 5.4, Version 10.7.0, Release 10
[3] EP 2 709 408 A1

The invention claimed is:

1. A method, performed by a network node, for enabling uplink power control in a wireless network, the method comprising:
    assigning a transmit power for downlink transmission of a reference signal, wherein the reference signal is to be used for power control of at least one uplink transmission;
    determining a reference signal transmit power parameter providing a fictitious value for the transmit power of the reference signal that is different from the assigned transmit power; wherein said determining a reference signal transmit power parameter comprises the steps of, determining a delta value; and
        adding the delta value to the assigned transmit power; wherein the delta value is selected to compensate for a noise floor difference, and wherein the noise floor difference is a representative of a difference between an indoor noise floor and an outdoor noise floor; and
    transmitting the reference signal transmit power parameter to at least one wireless device to enable the wireless device(s) to perform transmit power determination for the uplink transmission(s) at least partly based on the fictitious value for the transmit power of the reference signal.

2. The method of claim 1, wherein the reference signal transmit power parameter indicates a fictitious value for the transmit power of the reference signal that is higher than the assigned transmit power.

3. The method of claim 1, wherein the reference signal transmit power parameter is a cell-dependent parameter that enables uplink power control for multiple wireless devices in a cell of the wireless network.

4. The method of claim 1, wherein the reference signal transmit power parameter is transmitted in a reference Signal Power information element.

5. The method of claim 1, wherein the reference signal transmit power parameter is transmitted via Radio Resource Control and/or System Information Block signaling.

6. The method of claim 1:
    wherein the wireless network is based on Long Term Evolution;
    wherein the reference signal transmit power parameter enables power control for Physical Uplink Shared Channel, Physical Uplink Control Channel, and/or Physical Random Access Channel.

7. The method of claim 1, wherein the method is used for indoor deployments and/or heterogeneous networks.

8. A network node configured to enable uplink power control in a wireless network, the network node comprising:
    processing circuitry;
    memory containing instructions executable by the processing circuitry whereby the network node is operative to:
    assign a transmit power for downlink transmission of a reference signal, wherein the reference signal is to be used for power control of at least one uplink transmission;
    determine a reference signal transmit power parameter providing a fictitious value for the transmit power of the reference signal that is different from the assigned transmit power; wherein said determination of a reference signal transmit power parameter comprises determination of a delta value; and addition of the delta value to the assigned transmit power; wherein the delta value is selected to compensate for a noise floor difference, and wherein the noise floor difference is a representative of a difference between an indoor noise floor and an outdoor noise floor; and
    transmit the reference signal transmit power parameter to at least one wireless device to enable the wireless device(s) to perform transmit power determination for the uplink transmission(s) at least partly based on the fictitious value for the transmit power of the reference signal.

9. The network node of claim 8, wherein the instructions are such that the network node is operative to determine the reference signal transmit power parameter indicating a fictitious value for the transmit power of the reference signal that is higher than the assigned transmit power.

10. The network node of claim 8, wherein the instructions are such that the network node is operative to determine the reference signal transmit power parameter as a cell-dependent parameter that enables uplink power control for multiple wireless devices in a cell of the wireless network.

11. A non-transitory computer readable recording medium storing a computer program product for configuring a network node to enable uplink power control in a wireless network, the computer program product comprising software instructions which, when run on processing circuitry of the network node, causes the network node to:
    assign a transmit power for downlink transmission of a reference signal, wherein the reference signal is to be used for power control of at least one uplink transmission;
    determine a reference signal transmit power parameter providing a fictitious value for the transmit power of the reference signal that is different from the assigned transmit power; wherein said determination of a reference signal transmit power parameter comprises determination of a delta value; and addition of the delta value to the assigned transmit power; wherein the delta value is selected to compensate for a noise floor difference and wherein the noise floor difference is a representative of a difference between an indoor noise floor and an outdoor noise floor; and
    transmit the reference signal transmit power parameter to at least one wireless device to enable the wireless device(s) to perform transmit power determination for the uplink transmission(s) at least partly based on the fictitious value for the transmit power of the reference signal.

\* \* \* \* \*